HARDTOP CONVERTIBLE AUTOMOBILE STRUCTURE

Filed Sept. 4, 1958 5 Sheets-Sheet 1

INVENTOR.
JOHN C. RUND
BY
Robinson & Berry
ATTORNEYS.

Feb. 13, 1962 J. C. RUND 3,021,174

HARDTOP CONVERTIBLE AUTOMOBILE STRUCTURE

Filed Sept. 4, 1958 5 Sheets-Sheet 2

INVENTOR.
JOHN C. RUND
BY
Robinson & Berry
ATTORNEYS

INVENTOR.
JOHN C. RUND
BY
Robinson & Berry
ATTORNEYS

Feb. 13, 1962 J. C. RUND 3,021,174

HARDTOP CONVERTIBLE AUTOMOBILE STRUCTURE

Filed Sept. 4, 1958

5 Sheets-Sheet 4

INVENTOR.
JOHN C. RUND

BY
Robinson & Berry
ATTORNEYS

Feb. 13, 1962 J. C. RUND 3,021,174

HARDTOP CONVERTIBLE AUTOMOBILE STRUCTURE

Filed Sept. 4, 1958 5 Sheets-Sheet 5

INVENTOR.
JOHN C. RUND
BY Robinson & Berry
ATTORNEYS

3,021,174
HARDTOP CONVERTIBLE AUTOMOBILE STRUCTURE

John C. Rund, 12222 25th SW., Seattle, Wash.

Filed Sept. 4, 1958, Ser. No. 759,021
4 Claims. (Cl. 296—107)

This invention relates to improvements in automobiles of those types known in the industry as "hard top convertibles." More specifically, the present invention has to do with improved details of construction of the convertible, hard top structures of automobiles and in the provision of novel means whereby a hard top structure may be properly supported in a raised and normal position of use over the passenger or seating compartment of the vehicle and can be easily and readily moved between that position and a retracted and lowered position of storage back of the seating compartment.

This application is a continuation-in-part of my copending application filed on January 24, 1956, under Serial No. 561,013, now forfeited.

The principal objects of the present invention are: To provide improvements in hard top convertibles of the kind or character above stated including means whereby the vehicle top structure is supported for easy rolling movement between its raised and retracted or stored positions; to provide for an easier and more advantageous storing of the top structure in its retracted or lowered position; that, in one adaptation of the invention, provides for the convenient "external" storage of the retracted or lowered top structure on top of the trunk compartment of the automobile, and in another adaptation, herein designated as "internal" storage provides that the top structure can be lowered into the trunk compartment and stored therein without materially reducing the trunk storage area.

It is also an object of the present invention to provide the present retractable hard top structure with supporting rollers, adapted for travel in guideways or guiderails, whereby it is easily movable and is held substantially in horizontal position during its movements between stored and raised positions.

Other objects of the invention reside in the details of construction and relationship to each other of the guiderails in which the top mounting rollers travel, and in the mounting of the guiderails within the body structure.

It is also an object of the present invention to provide a convertible hard top structure including telescopically associated front and rear sections of novel construction, and also to provide a novel form of retractable rear window for a top that is designed for external storage.

Yet another object of the invention resides in the provision of a retractable hard top and mounting structure therefor that permits use of a variety of external shapes for the top of the trunk compartment.

Still further objects and advantages of the present invention reside in the various details of construction and combination of parts, and in their mode of operation, as will hereinafter be fully described.

In accomplishing the above mentioned and other objects of the invention, I have provided the improved details of construction, the preferred forms of which are illustrated in the accompanying drawings, wherein.

Figure 1:
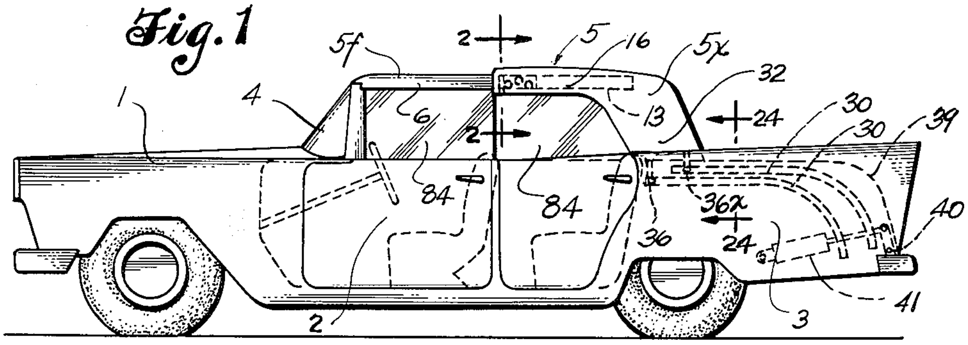
FIG. 1 is a side view of a four door, sedan type automotive vehicle with a retractable hard-top designed for internal storage and embodying the improvements of the present invention therein; this view showing the top structure in its normal, raised or extended position of use.
Figures 20, 21, 22:
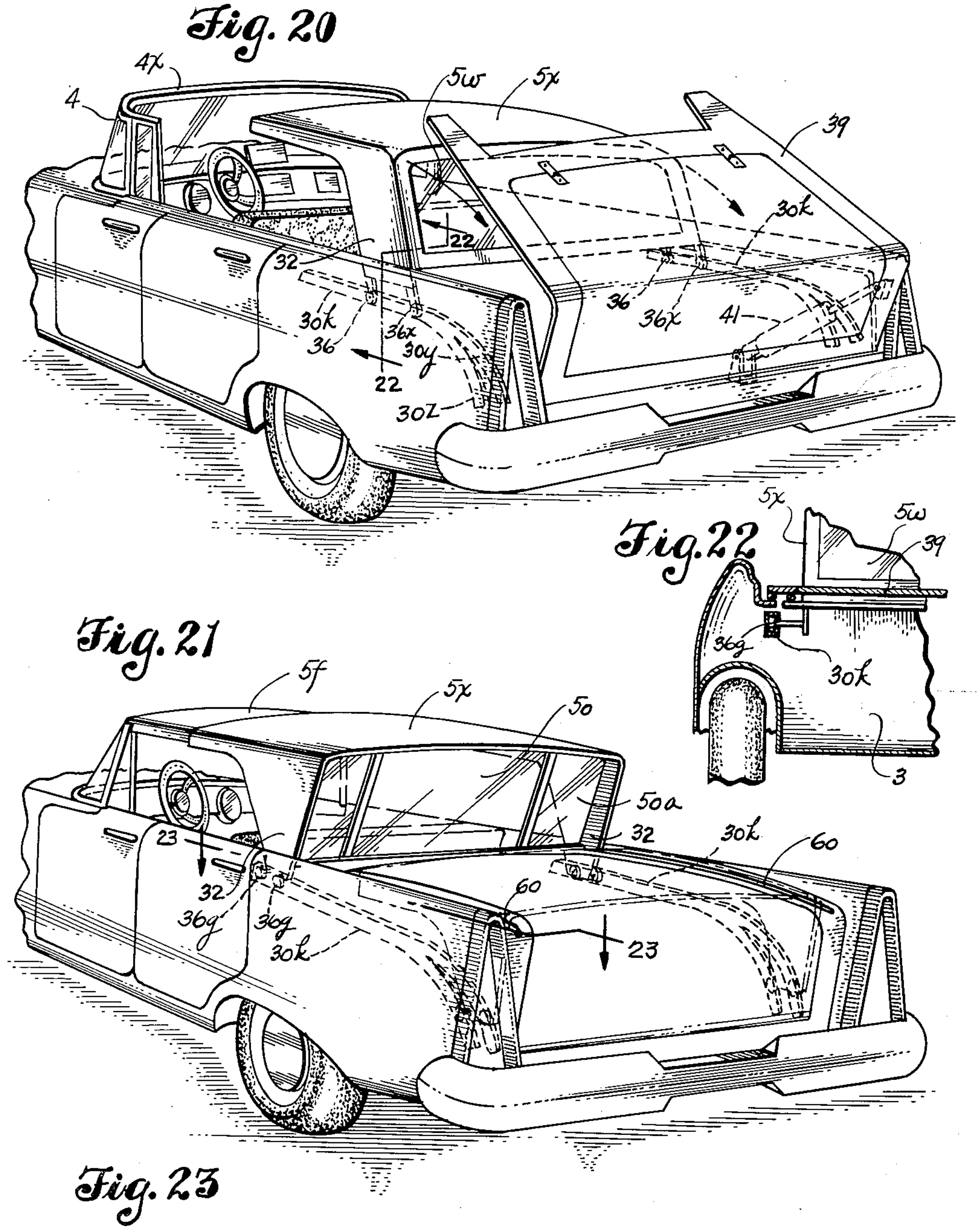
FIG. 20 is a perspective view of an automobile showing the manner of "internal storing" of its top structure.
FIG. 21 is a similar perspective view illustrating the arrangement of parts for the external storing of the vehicle top structure.
FIG. 22 is an enlarged vertical section taken on line 22—22 in FIG. 20, showing the relationship of the guiderail to the inside wall of the fender.
Figure 23:
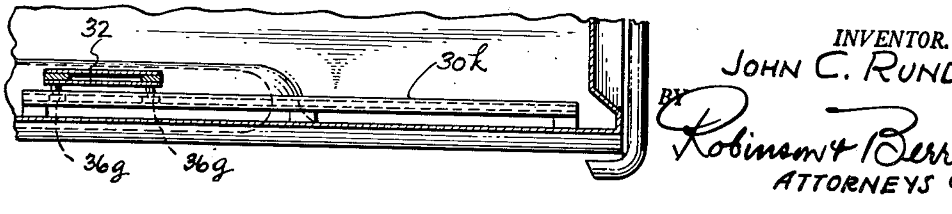
FIG. 23 is a horizontal section, taken on line 23—23 in FIG. 21, showing the relationship of guiderail to outside wall of the wheel fender.

Referring more in detail to the drawings:

The hard top structure, as applied to the automobile of FIG. 1, which is one of four door sedan type is designed for "internal storage" in accordance with the operation illustrated in FIG. 20.

In this vehicle, the rear end trunk compartment, located rearward of the back seat and between the opposite rear wheel fenders and wheel housings, is equipped with a lid or cover that includes a top portion and a rear end wall. This lid is hinged at the lower edge of its rear end wall to the floor or frame structure for upward and rearward swinging from closed to its open position. This lid movement might be manually accomplished but is herein indicated as being mechanically done by use of a power cylinder. When the lid is in raised position, the hard top structure, with the sections thereof telescopically collapsed for storage as presently explained, can be lowered into the trunk compartment between the opposite side edges of its top opening. Then the lid can be closed thereover.

Figure 4:
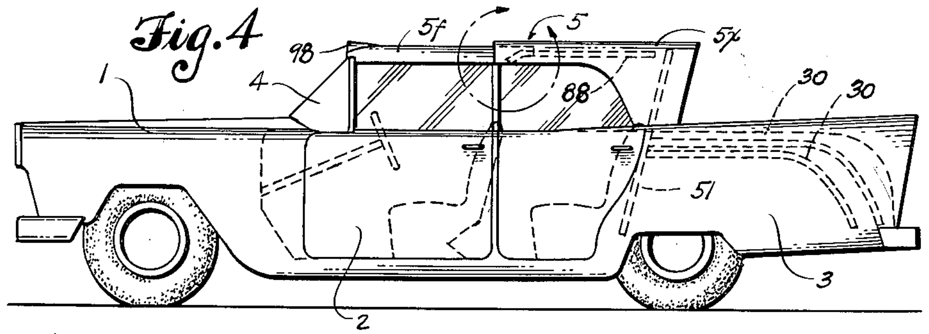
FIG. 4 is a side view of a four door automobile, equipped with a retractable hard top, as designed for "outside storage" and showing the hard top in its raised or extended position.

The vehicle shown in FIG. 4 has a retractable hard top structure designed for external storage, that is, for storage on top of the trunk lid and does not require any change in position of the lid to permit such storage. When it is in lowered or stored position, it rests along its opposite side edges on the shoulder portions of the fender formed immediately adjacent opposite edges of the top opening to the compartment.

Figure 24:
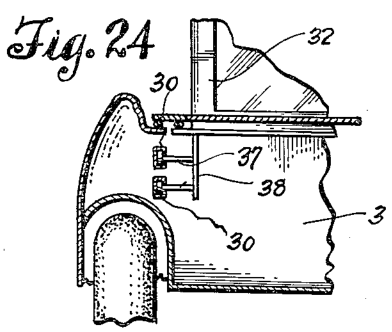
FIG. 24 is an enlarged cross-section taken on line 24—24 in FIG. 1.
Figure 25:
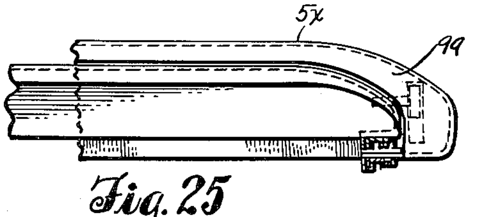
FIG. 25 is a front end elevation of a part of the top structure.

Each type of top structure, whether the vehicle is designed for its internal or external storage, employs the present form of guide rails and roller mountings, in various forms, as will presently be described in detail, but first a description of the telescopically arranged top sections of the hard top shown in FIG. 1 will be given. In this view, it is indicated that the vehicle top is supported for travel by paired guiderails located in the trunk compartment; the guiderails being mounted therein in the relationship to the wheel housings, and to the opposite side edges of the top opening to the trunk, as shown in FIG. 24.

In FIG. 1, the hood portion of the automobile is designated by numeral 1; the main body or passenger containing portion by numeral 2; the trunk or luggage compartment by numeral 3; the windshield by numeral 4 and the top structure is designated in its entirety by numeral 5. This top structure comprises a forward section *5f* that is telescopically adjustable into and from the rear section to permit a necessary shortening of the top for its disposition on or within the trunk compartment, in the intended manner as presently explained.

Figure 3:
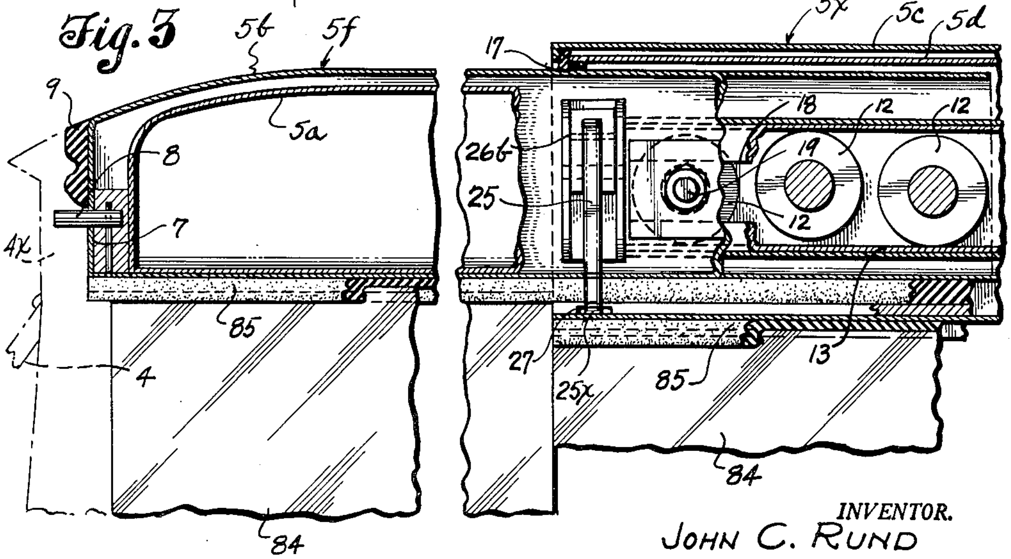
FIG. 3 is a longitudinal, vertical section, taken substantially on line 3—3 in FIG. 2, showing the assembled arrangement of the telescopic top forming sections and the guiderails or tracks containing the rollers for support and easy movement of the forward section.

Referring now particularly to FIG. 3, the front or forward section *5f* of the top structure is there shown to be telescopically adjustable into and from the top portion of the rear section *5x*. The top section, *5f*, comprises inner and outer surface forming plates, designated by numerals *5a* and *5b*, which are so joined along opposite edges as to provide hollow, parallel and downwardly directed opposite side flanges 6 and 6, and a similar flange 7 across its front end. The cross-flange 7 is equipped with a plurality of forwardly projecting studs 8 and a longitudinal joint sealing strip 9 of rubber. The studs are adapted to enter sockets provided therefor in the horizontal top rail *4x* of the windshield 4, when this section of the top is fully extended, thus to support that end of the top. The strip 9 is designated to engage the cross-rail of the windsheild to seal the joint between them.

Figure 2:
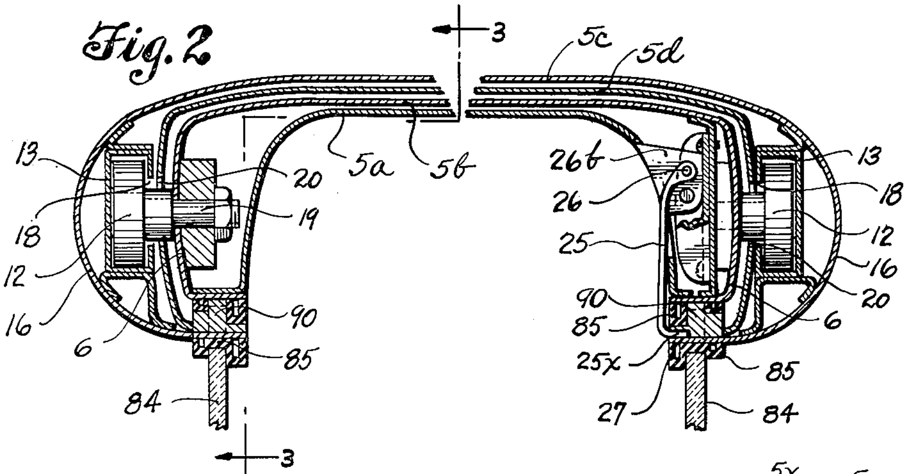
FIG. 2 is an enlarged cross-sectional view, taken on line 2—2 in FIG. 1, showing the assembled arrangement of the forward and rearward sections of the top structure for telescopic adjustment, the medial portions of the parts being removed in order to lessen the width of the view.

Each of the opposite side flanges 6—6 of this top section *5f* is equipped at its rear end and at the outside thereof, with three rollers 12; these being disposed in horizontal alignment for travel in guideways 13—13 that are fixed within the opposite side portions of the rear section *5x* of the top structure, preferably by the means and manner shown in FIG. 2.

The rear section *5x* of the hard top structure is made up of suitable plates *5c* and *5d*, forming its top and under surfaces, respectively. These plates are shaped to form guideway housings 16—16 along its opposite sides and it is within these housings that the roller mounting guideways 13—13 are fixed in parallel relationship, by suitable means, such as shown best in FIG. 2.

When the front section *5f* of the top 5 is fully extended and joined for support to the top rail of the windshield, its rearward edge portion is contained within the forward edge portion of the rear section *5x* as shown in FIG. 3. Joint sealing gaskets 17 are secured within the forward edge of the top section as shown in FIG. 3, to seal the joint against leakage.

The guideways 13—13 which contain the rollers 12 are of tubular form, rectangular in cross-section and slotted, as at 18, along their inside walls to their full length. The rollers 12 are mounted for rotation on stud bolts 19 that are fixed in the side rails 6 of the top section *5f* as shown in FIG. 2. The inside walls of the guideway housings 16 are longitudinally slotted, as at 20 in FIG. 2 to pass the stud bolts therethrough for travel of the rollers along the guideways to the extent desired.

It is to be observed by reference to FIG. 3 that there are three rollers 12 applied at each side of the top section *5f*. The front and rear rollers of each set roll freely in the guideways 13 and bear against the lower flanges thereof while the middle roller is slightly raised to bear only against the upper flange. This arrangement of rollers provides that the telescopic adjustment of the top section may be made easily and without any looseness or binding of rollers in the guideways.

When the forward top section *5f* has been shifted to either of its extremes of travel, it can be locked there against movement by latch levers such as that designated by numeral 25 and shown at the right hand side in FIG. 2 and also seen in FIG. 3. This lever is pivotally fixed at its upper end, as at 26, to a bracket *26b* fixed to the inside wall of the side rail 6 of the top structure and directed outwardly therefrom, at a location immediately forward of the set of guide rollers. This lever is equipped at its lower end with an out-turned portion *25x* that is adapted to be pressed within a slot 27, formed in the lower edge portion of the housing 16, when the top section *5f* is fully extended. Likewise, there is a similar slot located in position to receive the hook *25x* when the top section is fully retracted. Such latch levers are applied to the top at opposite sides.

In order that the top structure 5 can be moved rearwardly from its raised position of FIG. 1 to a stored position within the trunk compartment, the rear top section, designated by reference numeral *5x* is supported and mounted for rearward travel from raised position along a pair of guiderails 30—30 that are fixedly mounted within the rear end portion of the vehicle; there being a pair of rails at each side. These guiderails may be of various forms as later explained but first will be considered to be like those shown in FIGS. 1, 12, 13 and 17. In these views, the paired guiderails are shown to be located at opposite sides of the trunk compartment and within the opposite rear fenders of the vehicle. These pairs of guiderails, as applied at opposite sides of the trunk compartment, are parallel and located one above the other just outside of the vertical planes of the opposite side edges of the top opening of the trunk compartment, as has been illustrated in FIG. 24.

Figures 16, 17, 18, 19:
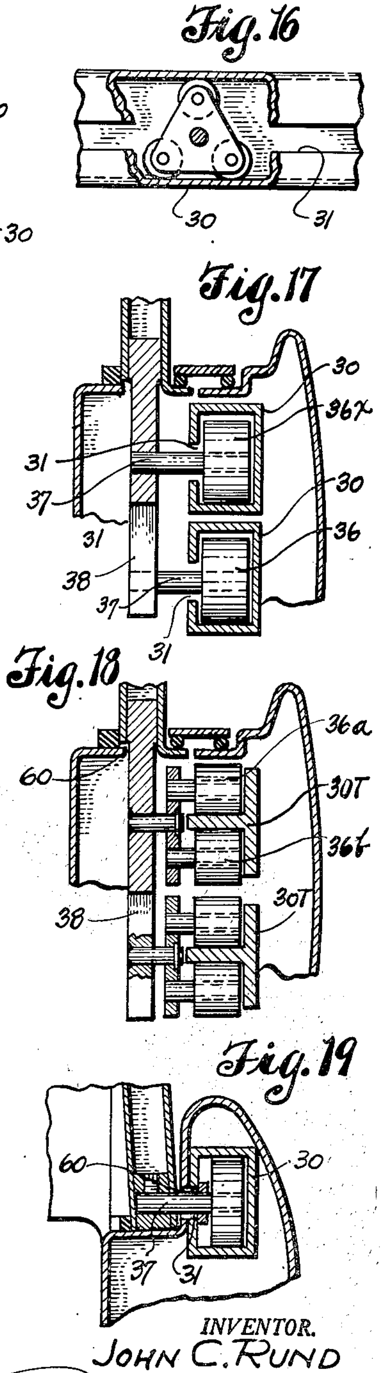
FIG. 16 is a view illustrating an alternative arrangement of top supporting rollers as applied within a tubular form of guiderail.
FIG. 17 is a vertical cross-section, taken on line 17—17 in FIG. 12.
FIG. 18 is a cross-section taken in line 18—18 in FIG. 14.
FIG. 19 is a cross-sectional detail of a guiderail of tubular or channel form as applied within a body fender, and showing a top mounting and guiding roller as contained therein.

Each guiderail 30 is of that tubular form shown in FIG. 17 and is rectangular in cross-section; each being formed to its full length, in its inside wall, with a continuous slot 31. Also, each guiderail has a straight and substantially horizontal forward end portion leading, at its rear end, into a downwardly curved continuing portion. The horizontal portions of paired guiderails are disposed close together throughout their lengths, as indicated in FIG. 1, but their downwardly curving rear end portions are spaced, one ahead of the other, as well shown in FIG. 13.

The back wall forming portion of the rear section 5x of the hard top structure is downwardly and rearwardly inclined and contains therein the usual rear window 5w. It also is formed at opposite sides with side wall portions 32, designated as the "flanges." Adjacent its lower edge and at the outside thereof, each flange 32 has two top supporting rollers, 36 and 36x, mounted thereon; these being spaced in the longitudinal direction of the guiderails 30—30 and are contained for travel therein, respectively.

Figures 12, 13, 14, 15:
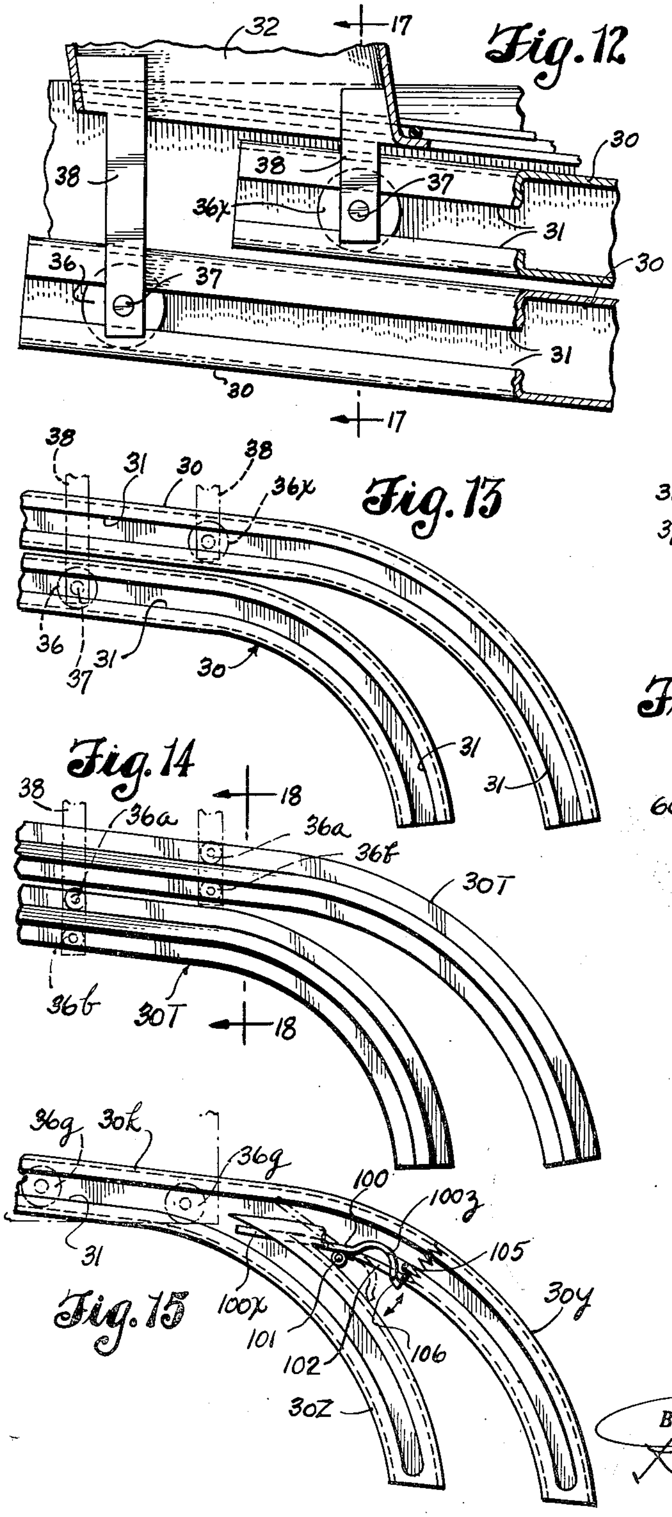
FIG. 12 is an elevation of the forward end portions of parallel guiderails for support and travel of the retractable top structure, with the top supporting rollers as contained therein; this guiderail arrangement being employed in the vehicles shown in FIGS. 1 and 4.
FIG. 13 is an elevation of the rear end portion of those guiderails which are shown in FIG. 12.
FIG. 14 is a view showing guiderails of T-bar form in cross section.
FIG. 15 is an elevation of another form of guiderail that terminates, at its rear end, in two downwardly curving branches; this form being employed in the vehicles illustrated in FIGS. 7, 20 and 21.

The relationship of the supporting rollers 36—36x to the top structure is well shown in FIG. 12 wherein it will be observed that each roller is mounted for rotation on a stub axle 37 that is fixed in and extended outwardly from a roller mounting leg 38 that is welded or otherwise fixed to the lower edge of the flange 32. These legs extend downwardly into the trunk compartment closely adjacent the side edges of the trunk opening, as seen in FIG. 24, and closely adjacent the slotted sidewalls of the guiderails. The stub axles 37 extend outwardly from the legs into the guiderails through the slots 31 formed therein.

When the top 5 is in its raised position, as in FIG. 1, and the trunk lid is closed thereagainst, the top cannot move rearwardly as will be understood by reference to FIG. 20. In FIGS. 1 and 20, the lid for the trunk compartment has been designated by numeral 39, its hinge mounting is designated at 40 and the power cylinder for effecting its raising and lowering is designated by numeral 41.

Assuming that the vehicle top 5 is in its raised position, as shown in FIG. 1, and that it is desired to lower it to stored position, the operation would be substantially as follows: First, the lid 39 covering the trunk compartment would be raised to a position corresponding to that of FIG. 20. Then the forward section 5f of the top structure would be released from its supporting connection with the windshield, and telescoped into the top section 5x and secured by the latches 25. The top would then be moved rearwardly along its supporting guiderails 30—30 to its position of storage in the trunk compartment and as the rollers 36—36' move rearwardly in the guiderails 30—30 they retain the top structure in a normal horizontal position, both in its rearward travel and in its final lowering into the trunk compartment as the rollers move into and along the downwardly curving rear end portions of the guiderails. The top structure finally comes to rest as the rollers reach the lower rear ends of the rails. Then the trunk compartment lid 39 can be closed thereover.

To return the top to raised position, the lid 39 is first raised, then the top is lifted or pulled upwardly and forwardly along the guiderails to its forward limit of travel. Then the front section 5f is extended forwardly and attached to the top rail of the windshield for support and securement. The lid 39 is then closed, and in closing, its forward edge engages with the rear wall of the top in a weather tight joint as effected by use of joint sealing gaskets.

In this manner of mounting and moving the hardtop structure, it is also anticipated that instead of employing guiderails as illustrated in FIGS. 12 and 13, those illustrated in FIGS. 14 might be employed in a like manner These guiderails, which are designated by reference numerals 30T—30T, are of T-bar cross-sectional form, as shown in FIG. 18, and in use they would be mounted in the trunk compartment at the same locations as those previously described. However, when these rails are used, the legs 38 which are fixed to the wall flanges 32 would each be equipped with rollers 36a and 36b arranged to cooperatively engage upper and lower faces of the horizontal flange of the guiderail.

Figures 7, 8, 9:
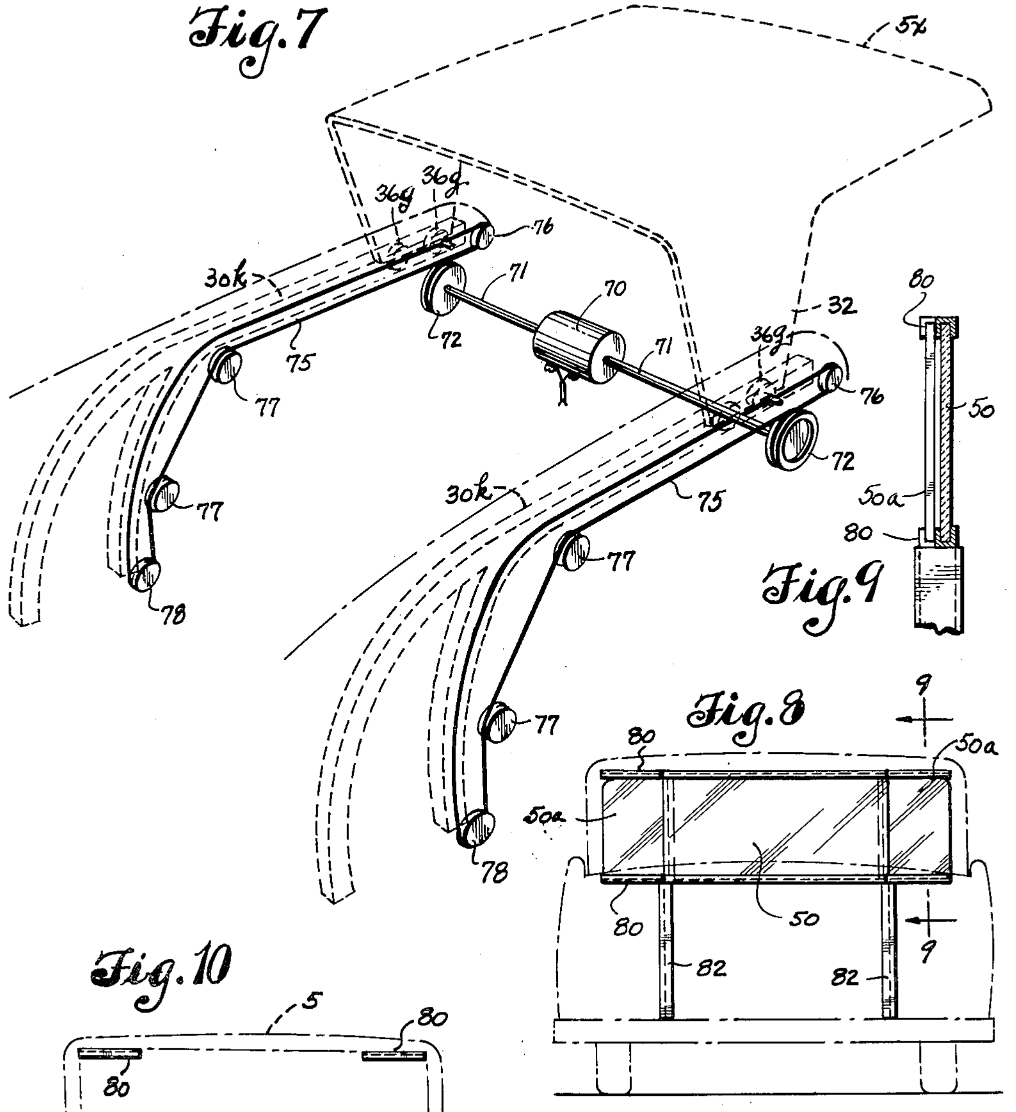
FIG. 7 is a view in perspective, schematically showing in dash lines, a retractable top structure, and the arrangement of guiderails that contain the supporting rollers of the top structure. Also, showing power means for moving the top structure between raised and retracted positions.
FIG. 8 is an elevation showing the retractable rear window of the convertible top illustrated in FIG. 4; the vehicle being outlined in dash lines.
FIG. 9 is an enlarged cross-section, taken on line 9—9 in FIG. 8.
Figure 10:
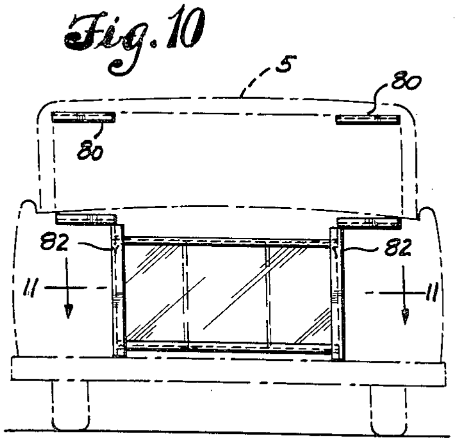
FIG. 10 is an elevation, similar to that of FIG. 8, showing the opposite side panels of the window retracted and the window in its lowered position.
Figure 11:
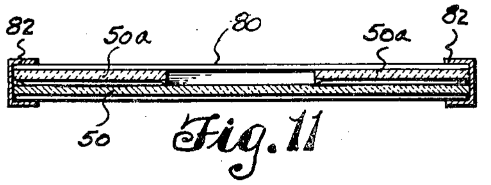
FIG. 11 is an enlarged section, taken on line 11—11 in FIG. 10.

Likewise, instead of employing either of those forms of guiderails previously described, the hard top structure could be carried by guiderails as illustrated in use in FIGS. 7, 20 and 21, and shown in enlarged detail in FIG. 15. This particular form of guiderail, designated by numeral 30k is of single channeled, tubular form, rectangular in cross-section, as seen in FIG. 19, and terminates at its rear end in two downwardly curving branches, 30y and 30z. These guiderails, 30k, are used singly at opposite sides of the trunk compartment, in a manner similar to that previously explained in connection with guiderails 30—30. The supporting rollers as applied to each of the flanges 32 are both contained in the same guiderail for support and easy rolling movement of the top from raised to lowered positions. As the top is moved rearwardly along the guiderails, the rollers automatically enter the proper branches at their rear ends; this being due to the fact that the natural tendency of the top structure to tilt downwardly in a forward direcion, causes the rear roller to bear against the top flange of the guiderail while the forward roller bears against its lower flange.

Referring now to the invention as provided for external storage of the top structure by its disposition upon the trunk. In this adaptation the top structure shown in FIG. 4, in general, is the same as that of FIG. 1 in that it comprises a forward section 5f that is telescopically adjustable into the top portion of the rear section 5x. Also, in that the top is equipped for securement in the same way, when fully raised, to the windshield and is equipped with latches for holding the forward section in its extended or in its retracted positions.

The rearward section 5x is herein shown especially in FIG. 21, to be open at the rear end this open end is fitted with and adapted to be closed by a window 50 comprising retractable opposite side panels, and a central panel. When retracted, these can be lowered into a compartment immediately rearward of the rear seat of the vehicle, designated at 51 in FIG. 4, to clear the top structure for movement.

The top structure 5x has a top portion and opposite sidewall flanges 32 which, in the externally stored position of the top, closely conform to the shape of the trunk top and adjacent side portion.

To adapt the vehicle to the present exterior storage of the top as of FIG. 4, each of the rear wheel fenders is formed lengthwise thereof, to its full length, with a slot 60; these slots, as provided at opposite sides being in parallel relationship.

The top structure, as designed for exterior storage, using the single guide rails of FIG. 15 for support, are equipped for travel by a pair of rollers, 36g—36g mounted on the outer sides of the lower ends of the flanges 32. These paired rollers located at each of the opposite sides of the trunk compartment are contained in guiderails 30k—30k fixed in the fenders in the same way as previously described. However, in this external storage, flanges 32 extend downwardly through the fender slots 60 and closely adjacent the open sides of the guiderails.

When it is desired to lower the top 5 for storage, its forward edge is detached from the windshield and the section 5f is telescoped into the rear section and there secured by latches 25. Then the top is shifted rearwardly, as supported by the pairs of rollers 36g—36g, along the guiderails 30k until it comes to rest close to or upon the lid of the trunk compartment. It will then be as shown in dash lines in FIG. 21. To raise the top and to secure it in position of normal use, the above operations are merely reversed.

Power means for effecting the moving of the top structure between stored and extended or raised position, for either internal storage, as in FIG. 20, or external storage as in FIG. 21, might be employed. In FIG. 7, I have schematically indicated a satisfactory power system wherein 70 designates an electric motor that is fixedly mounted in the automobile back of the rear seat. From it, drive shafts 71—71 extend to opposite sides where they are equipped with belt wheels 72—72; these being located at the forward ends of the guiderails which carry the top structure. Attached to the bolt axle of the forward roller as mounted in each flange is a cable 75, which extends forwardly therefrom, over a stationary sheave wheel 76, thence rearwardly and is wrapped once about the corresponding belt wheel 72 at that side, thence rearwardly over grooved guide wheels 77 and around a stationary sheave wheel 78 at the rear end of the rail and then returns through or along the corresponding guiderail to the bolt axle of the forward roller and is secured thereto. With this driving connection, driving of the electric motor in one direction will operate to move the top rearwardly along the guiderails, and driving it in the opposite direction will move the top in the forwardly direction.

Referring now to the window structure as illustrated in FIGS. 8, 9, 10 and 11, it will be observed by reference to FIG. 8 that the window comprises a central glass panel 50 of elongated rectangular form, and extension panels 50*a*—50*a* at its opposite ends; these latter panels being movable horizontally in guiderails 80 such as that shown in FIG. 9, to positions within the end limits of the central panel. Then the retracted panels, together with the central panel can be lowered into the previously mentioned compartment 51 which is back of the rear seat of the vehicle, within guideways 82, to a position indicated by the showing of these parts in FIG. 10. This leaves the rear end of the top section 5*x* entirely open and its disposition on the top of the trunk can be accomplished in the intended manner.

It is further to be explained in reference to the showing of the top structure, as seen in FIG. 1, that glass panels 84 are vertically adjustable into and from the doors, and when the top 5 is raised and secured in that position, these panels can be raised from lowered positions to close against rubber sealing strips 85, as shown in FIG. 2, to be applied to the lower edges of the side edge flanges 6—6 and 16—16 as formed on the top sections 5*f* and 5*x*.

Figure 5:
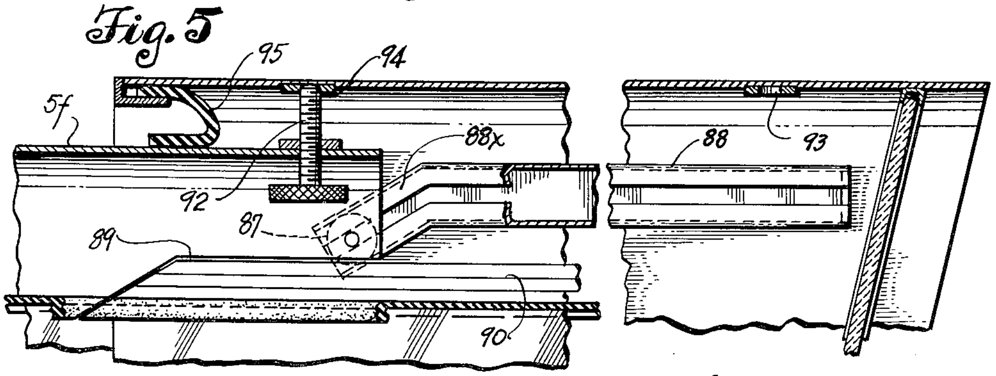
FIG. 5 is an enlarged, sectional detail, taken lengthwise of the structure, of interfitted portions of the front and rearward sections of the top as applied to the vehicle of FIG. 4 showing the front section fully extended from the rear section.
Figure 6:
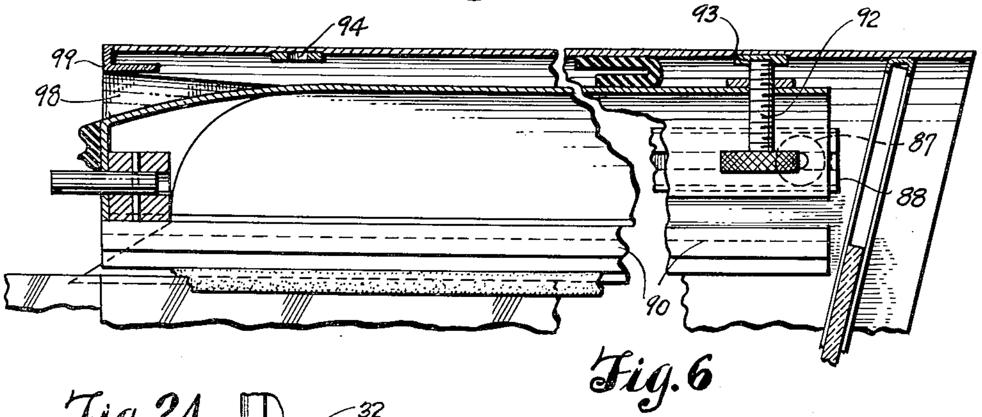
FIG. 6 is a similar view, showing the relationship of parts when the forward section is fully retracted.

Referring now to the telescopic arrangement of the top forming sections 5*f* and 5*x* of the vehicle shown in FIG. 4 wherein the principal parts of the vehicle have been given the same reference numerals as applied to corresponding parts of the vehicle in FIG. 1. In FIGS. 5 and 6, it has been shown that the forward section 5*f* is equipped at opposite side and adjacent its rearward end with single supporting rollers 87 which are contained for travel in guideways 88 that are fixed within the opposite side portions of the back section 5*x* to provide support for the forward section when extended. Insofar as the telescopic arrangement of these sections is concerned, it is like that previously described in connection with the vehicle of FIG. 1 although in their details of construction they are different. Also, the means of connection of section 5*f* with the windshield is the same. However, in this combination the forward end portions of the guideways 88 are downwardly and forwardly inclined, as shown at 88*x* in FIG. 5. When the section 5*f* is pulled forwardly from the telescoped position in which it is shown in FIG. 6, its supporting rollers 87 finally move into these downwardly inclined portions of the guideways, and the rear end of the section drops to a lower level which brings its lower edge even with the lower edge of the side flanges of the rear section 5*x*. When the forward section 5*f* is thus lowered, the upwardly offset rear end surfaces of its opposite side flanges, designated at 89 in FIG. 5, come to rest upon the forward ends of rails 90 applied horizontally along the insides of the lower edges of the housings 16, as shown both in FIGS. 2 and 3. When the front section is pushed rearwardly, as in telescoping it into the rear section, the rollers 87 move upwardly along the guideways 88 and lift that end of the section so that the side flanges 6—6 may then slide along the rails 98.

A holding screw 92, easily accessible to the vehicle driver, is threaded upwardly through the rear edge of the top section 5*f* to seat at its upper end in sockets 93 and 94 that are applied to the top wall of section 5*x*, as seen in FIG. 5, at locations for holding the top secure when extended or when in retracted positions. This holding screw arrangement can be replaced by the latch lever arrangement as shown in FIGS. 2 and 3, if desired.

A suitable compressible joint sealing strip 95 is applied across the top between the top sections, and is secured to the top surface of section 5*f* near its rearward edge. When the section is extended, this strip seals the joint along the forward edge of the section 5*x* as shown in FIG. 5. When the section 5*f* is moved rearwardly, the strip 95 moves with it. Centrally, at its forward edge, the section 5*f* carries a wedge shaped block 98 that tightens against the underside of the top edge of the rear section to hold the parts against looseness and avoid vibration noises when the section 5*f* is retracted.

It is shown in FIG. 6 that the forward end of the top section 5*x* is equipped with a closure strip 99 that conforms to the top surface of the extended forward top section to close the joint between them, especially when the top is extended. This is applied after insertion of the rollers in the guideways.

It is to be understood that either top structures, as shown in FIG. 1 and FIG. 4, may be supported and guided by guiderails like those of either FIG. 13, 14 or 15, and it is not the intent that either top be restricted to use of any specific form of guiderail.

It has also been shown, in FIG. 19, that the slots 60 in the fenders, for passing the axles or supports for the guiderollers 36 are so located in the top portions of the fenders that the axles for mounting the rollers can be extended directly outwardly from the flanges 32, thus eliminating the use of the roller mounting legs 38, as shown in FIG. 17.

In order that the top supporting rollers 36*g*—36*g* applied to guide rails 30*k* in the vehicles shown in FIGS. 20 and 21, may not accidently enter the wrong branch portions 30*y* or 30*z* of the rails, I have, in FIG. 15, illustrated a safety device that will cause the rollers to be positively directed into the proper channels. This device comprises a switch lever 100, pivotally mounted on a pin 101 that extends transversely between the two branches of the guide rail at a point closely adjacent their junction. The lever operates in a vertical plane in a slot 102 formed in the bottom wall of the rearward branch. The lever comprises a flat forwardly extended plate 100*x* that normally extends into and across the entrance to the lower branch and an upwardly and rearwardly arched rear end portion 100*z* that extends into the rearward branch. A coiled spring 105 attached under tension to a lateral ear 106 on the rear end portion of the lever and to the rail, operates to yieldingly hold the lever with its forward portion extended downwardly into the forward branch. Thus, when the top 5 is shifted rearwardly, the rear supporting roller 36*g* will pass across the plate 100*x* and engage with the arched portion 100*z* and press it downwardly. This moves the plate 100*x* upwardly to a position where it operates to deflect the forward roller 36*g* downwardly into the forward branch 30*z*. This switch lever, in no way interferes with return travel of the rollers into the forward part of the guiderail.

While I have illustrated top structures that differ in details of construction, and have shown guiderails of different kinds, it is not the intent to confine either top to the specific details shown or to the specific form of guiderails with which they are shown. The essence of the invention is believed to reside in the provision for either inside or outside storage of the top structure; in the provision for the telescopic collapsing of tops of the kind shown, and in the provision of means for holding the sections in positions of extension or retraction.

What I claim as new is:

1. In combination; an automobile body comprising a passenger compartment and a trunk compartment rearwardly thereof, a windshield across the body at the front of the passenger compartment, a rigid top structure having a back portion formed with opposite side flanges, means at the forward end of the top structure adapted to be supportingly fixed to the windshield frame, guide rails mounted within the body structure along opposite sides of the trunk compartment with their forward end portions disposed along the base portions of said side flanges of the top structure, each rail having a longitudinal slot and said top having roller mounting means rigidly fixed to each of the opposite side flanges, and extended therefrom into the corresponding rail through its longitudinal slot, two rollers mounted on said roller mounting means in spaced relationship along the rails, adapted for rolling and guiding contact with the rail for the moving of the top between a closed position over the passenger compartment to an open position in the area of the trunk compartment, each of said guide rails including a substantially horizontal longitudinal portion extending along the corresponding side of the trunk compartment and terminating at its rear end in two downwardly curved and diverging branches in the vertical plane of the rail into which the two rollers, as applied to the corresponding flange of the top structure, are respectively received when the top is moved to full open position.

2. The combination recited in claim 1 wherein the center of gravity of said top structure is forwardly of the supporting rollers, thereby producing a tendency for the top structure to tilt forward when moving rearwardly, thus causing the rearward supporting roller to move into the upper and rearward branch of the guide rail and the forward roller to automatically move into the lower branch.

3. In combination, an automobile body comprising a passenger compartment and a trunk compartment rearwardly thereof, a windshield across the body at the front of the passenger compartment, a rigid top structure having a back portion formed with opposite side flanges, means at the forward end of the top structure adapted to be supportingly fixed to the windshield frame, guide rails mounted within the body structure along opposite sides of the trunk compartment with their forward end portions disposed along the base portions of said side flanges of the top structure, each rail having a longitudinal slot and said top having roller mounting means rigidly fixed to each of the opposite side flanges, and extended therefrom into the corresponding rail through its longitudinal slot, two rollers mounted on said roller mounting means in spaced relationship along the rail, adapted for rolling and guiding contact with the rail for the moving of the top between a closed position over the passenger compartment to a position of storage rearwardly thereof; said trunk compartment having a substantially horizontal top closure wall and said rigid top structure being so shaped as to closely overlie the said top closure wall when in its stored position, and wherein each of the said guide rails include a substantially horizontal longitudinal portion extending along the corresponding side of the trunk compartment and terminating at its rear end in two downwardly curved and diverging branches in the vertical plane of the rail into which the two rollers, as applied to the corresponding flange of the top structure, are respectively received when the top is moved to stored position.

4. In combination, an automobile body comprising a passenger compartment and a trunk compartment rearwardly thereof, a windshield structure across the body at the front of the passenger compartment, a rigid top structure having a rear section and a forward section, said rear section being equipped with guide rails within its top portion at opposite sides thereof, said forward section being equipped at opposite sides of its rear end with supporting rollers supported within said guide rails for telescopic adjustment of said forward section into and from the rear section, said forward section having means at the forward end thereof for engaging a portion of the windshield structure to support the rigid top structure, said rear section including spaced depending sidewall portions at the rearward end thereof and on opposite sides thereof, guide rails secured to the body along opposite sides and within the trunk compartment with the forward end portion of said guide rails disposed along the base portions of said sidewalls of the top structure, said rails terminating adjacent the rear portion of said passenger compartment, each rail including roller supporting and guiding means, said top structure having roller mounting means rigidly fixed to each of said sidewall portions and extending therefrom, a plurality of rollers mounted on the roller mounting means associated with each side wall portion and being in spaced relationship with one another along the associated rail, the rollers having rolling and guiding contact with the associated rail for moving the top between a closed position over the passenger compartment to a position of storage rearward of the passenger compartment, each of said guide rails including a substantially horizontal, longitudinally extending portion extending along the corresponding side of the trunk compartment and terminating at its rear end in two downwardly curved and diverging branches in the vertical plane of the rail into which the rollers, as applied to the corresponding sidewalls of the top structure, are respectively received when the top is moved to full open position.

References Cited in the file of this patent

UNITED STATES PATENTS

| | | |
|---|---|---|
| 2,051,140 | Grimston | Aug. 18, 1936 |
| 2,105,293 | Paulin | Jan. 11, 1938 |
| 2,215,363 | Rupple et al. | Sept. 17, 1940 |
| 2,632,670 | Crenshaw | Mar. 24, 1953 |
| 2,686,076 | Helser | Aug. 10, 1954 |
| 2,733,954 | Blake | Feb. 7, 1956 |
| 2,759,761 | Dandini | Aug. 21, 1956 |
| 2,768,024 | Spear | Oct. 23, 1956 |
| 2,768,025 | Spear | Oct. 23, 1956 |
| 2,782,070 | Chabon | Feb. 19, 1957 |
| 2,785,922 | Chika | Mar. 19, 1957 |
| 2,841,441 | Evans | July 1, 1958 |
| 2,856,231 | Zeman | Oct. 14, 1958 |
| 2,860,004 | Hollowell | Nov. 11, 1958 |
| 2,869,923 | Mulichak | Jan. 20, 1959 |

FOREIGN PATENTS

| | | |
|---|---|---|
| 493,260 | Belgium | May 2, 1950 |